UNITED STATES PATENT OFFICE.

RALPH W. E. MacIVOR, OF LONDON, ENGLAND, ASSIGNOR TO METALS EXTRACTION CORPORATION LIMITED, OF LONDON, ENGLAND, AN INCORPORATED COMPANY.

TREATMENT OF SULFID ORES CONTAINING ZINC.

No. 863,411.

Specification of Letters Patent.

Patented Aug. 13, 1907.

Application filed February 2, 1906. Serial No. 299,180.

*To all whom it may concern:*

Be it known that I, RALPH WALDO EMERSON MACIVOR, a subject of the King of Great Britain, residing at London, England, have invented certain new and useful Improvements in the Treatment of Sulfid Ores Containing Zinc; and I do hereby declare the following to be a full, clear, and exact description of the invention, such as will enable others skilled in the art to which it appertains to make and use the same.

The ore is first slowly roasted at dull red heat and under known conditions favorable to the conversion of as much as possible of the zinc in the ore into soluble sulfates of zinc leaving the remainder of the zinc in the ore as oxid of zinc to be extracted in the manner hereafter described. The roasted ore is then lixiviated with—preferably—boiling water to dissolve out the zinc sulfate, and this solution after settling is run off into tanks where it is mixed with a solution of calcium chlorid when calcium sulfate is produced and precipitated, and the same time the chlorid of zinc formed passes into solution. The latter is run off from the precipitate and is the special means employed in dissolving out the zinc remaining in the lixiviated ore in the state of oxid. To carry out this part, it is necessary that the ore should be digested in the solution of zinc chlorid at boiling point for a time dependent on the quality and quantity of the material under treatment, and of the strength of the solution. If this operation is properly carried out, the chlorid of zinc in solution will become an oxychlorid of approximately $ZnCl_2,3ZnO$. To this solution is added either slaked lime, carbonate of lime, magnesia, or soda ash, in sufficient quantity to completely decompose the zinc chlorid. The precipitate of hydrate or carbonate of zinc so formed is finally washed free from chlorid and dealt with by known processes for the production of spelter. The ore after the removal of its zinc contents is treated for lead, silver, copper, and other metals, it may contain, by the usual smelting processes.

A modification of this process consists in completely dead roasting the zinc sulfid ore at a high temperature to convert the whole of the zinc in the ore into oxid of zinc and subsequently digesting the ore in chlorid of zinc solution to form the oxychlorid in the manner described.

Having now described my invention, what I desire to claim is:—

The process of extracting zinc from sulfid ores containing the same, which consists in converting by heat the zinc contained in the ore into soluble sulfate of zinc and oxid of zinc, washing out the soluble sulfate with water, adding to the solution thus obtained calcium chlorid, drawing off the solution of chlorid of zinc so formed, adding the latter to the treated ore, digesting the whole to form an oxychlorid of zinc, decomposing said oxychlorid by an alkaline hydrate, and removing the precipitated zinc compound and washing the same, substantially as described.

In witness whereof I have hereunto set my hand in the presence of two witnesses.

RALPH W. E. MACIVOR.

Witnesses:
 FREDERIC PRINCE,
 H. D. JAMESON.